United States Patent [19]

Eller

[11] Patent Number: 4,832,767

[45] Date of Patent: May 23, 1989

[54] WIRE SPLICE WRAPPING APPARATUS AND METHOD

[76] Inventor: Donald G. Eller, 50631 Wilton St., New Baltimore, Mich. 48047

[21] Appl. No.: 149,581

[22] Filed: Jan. 28, 1988

[51] Int. Cl.⁴ .............................................. H01B 13/08
[52] U.S. Cl. ........................................ 156/53; 53/399; 53/586; 53/590; 156/212; 156/468; 156/481; 156/484; 156/485
[58] Field of Search ................. 53/399, 586, 589, 590; 156/53, 212, 213, 468, 475, 481, 484, 485, 486, 488, 492

[56] References Cited

U.S. PATENT DOCUMENTS 2,543,323  2/1951  Marsh .............................. 156/484 X
3,466,847  9/1969  Farkas ............................. 156/484 X
3,864,191  2/1975  Tovarms ........................... 156/468

Primary Examiner—Robert A. Dawson
Attorney, Agent, or Firm—John R. Benefiel

[57] ABSTRACT

An apparatus and method is disclosed for wrapping a bundle of spliced wires to create a waterproof insulating cover for the splice, in which a segment of autogenous tape is fed over a cradle fixture prior to positioning the wire bundle thereover. Oppositely positioned hinged portions of wrapping members are each sequentially advanced to successively engage and fold each end of the tape segment over the wire bundle, each member cammed as it is advanced plunging down to press the tape end over the wire bundle. A pressure platen is advanced down onto the wrapped bundle to band the lapped tape portions together, with a relief cavity preventing undue thinning of the tape in the region of the uninsulated wire splice.

10 Claims, 4 Drawing Sheets

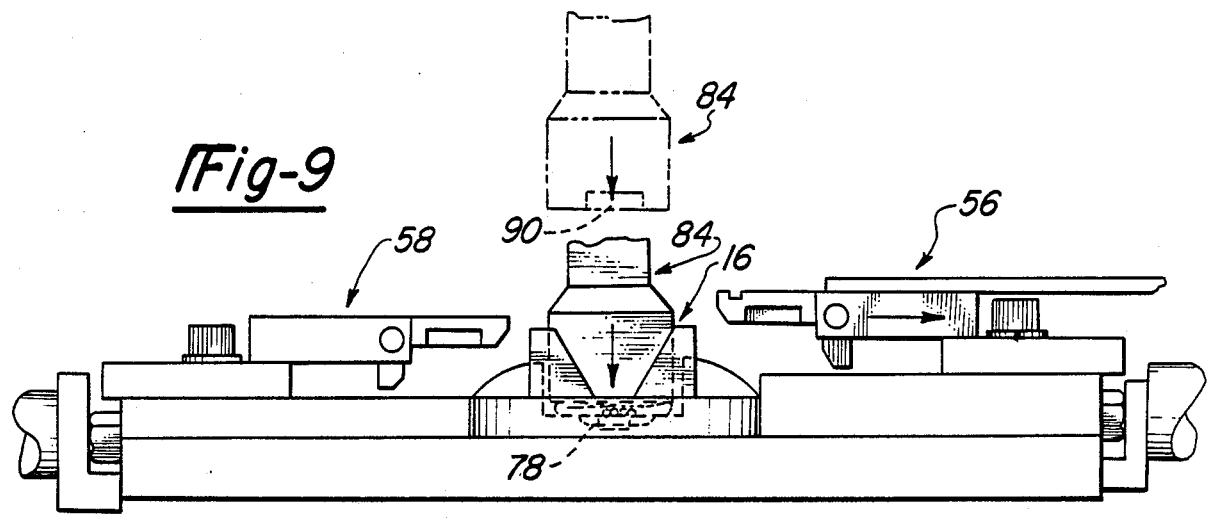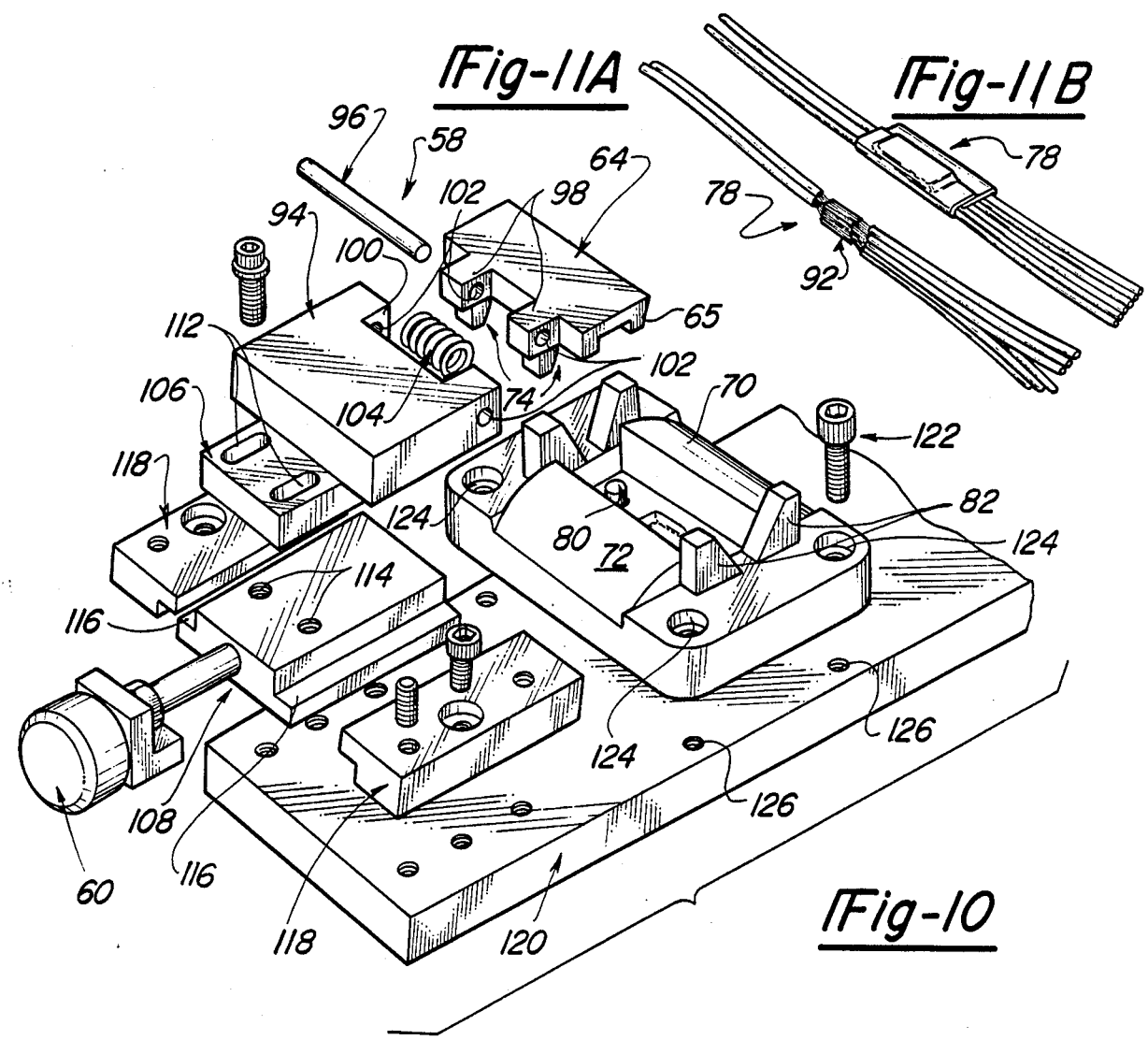

WIRE SPLICE WRAPPING APPARATUS AND METHOD

BACKGROUND OF THE INVENTION

This invention concerns wrapping or banding of a bundle of spliced electrical wires to effectively insulate the splice so as to prevent entrance of moisture.

Such operations are sometimes required in manufacturing wire harnesses for autos, often with production in very large quantities.

Heretofore such operations have been typically performed entirely manually, and thus represents a significant cost item for such production in large numbers.

The banding process must provide a complete reliable seal to prevent the entrance of moisture as could create a short or current leakage from the electrical circuit. Such a seal is difficult to achieve around a bundle of individually insulated wires.

It is an object of the present invention to provide a method and apparatus for wrapping a bundle of wires spliced together, so as to create a sealed cover, which utilizes powered rather than manual steps increasing the speed of production and the reliability of the resulting banding.

SUMMARY OF THE INVENTION

This and other objects of the present invention which will be understood upon reading the following specification and claims are achieved by feeding a segment of self-welding or autogenous tape across a cradle fixture. The wire bundle is manually positioned atop the tape segment and a pair of oppositely directed wrapping members are sequentially advanced to engage a respective end of the tape segment and wrap the same over the wire splice. The portions of the wrapping members engaging the tape segment are each hinged to be able to pivot down against the bias of a torsion spring, and a camming action forces each wrapping member portion to hinge downwardly as it advances. This creates a plunging motion as each wrapping member is successively advanced, to force the respective tape segment end over and down against the wire splice.

A pressure platen then descends to compress the wrapped tape and insure sealing of the tape layers to each other and the wires in the bundle. A central relief cavity in the pressure platen insures that the tape layers over the wire splice are not unduly thinned during the compression of the wrapped wire bundle.

DESCRIPTION OF THE DRAWINGS

FIG. 9 is an enlarged side elevational view of the components shown in FIG. 8 with the pressure platen descended to comprise the wrapped wire bundle.

FIG. 10 is an enlarged exploded perspective view of the outside wrapping members and cradle fixture.

FIG. 11a is a perspective view of a spliced wire bundle prior to wrapping.

FIG. 11b is a perspective view of the spliced wire bundle shown in FIG. 11a after wrapping.

DETAILED DESCRIPTION

In the following detailed description, certain specific terminology will be employed for the sake of clarity and a particular embodiment described in accordance with the requirements of 35 USC 112, but it is to be understood that the same is not intended to be limiting and should not be so construed inasmuch as the invention is capable of taking many forms and variations within the scope of the appended claims.

Figure 1:
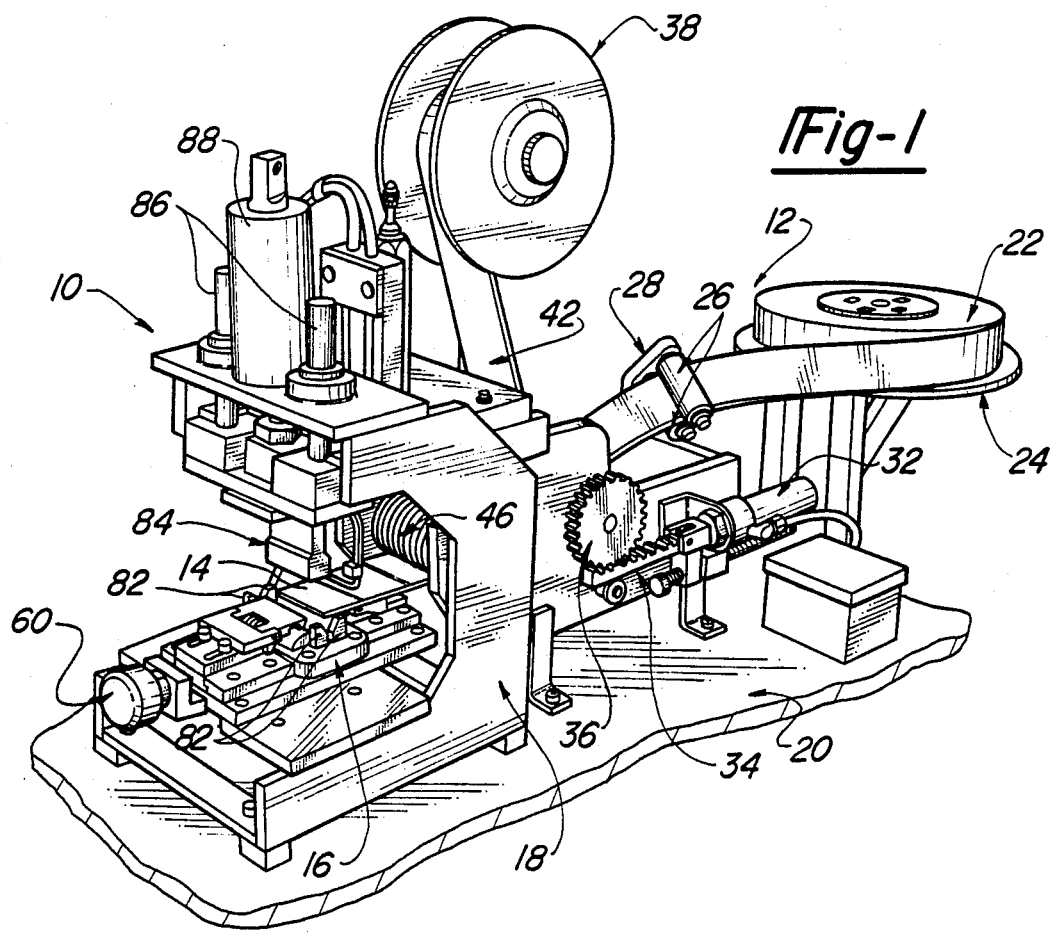
FIG. 1 is perspective view of the apparatus according to the present invention.
Figure 2:
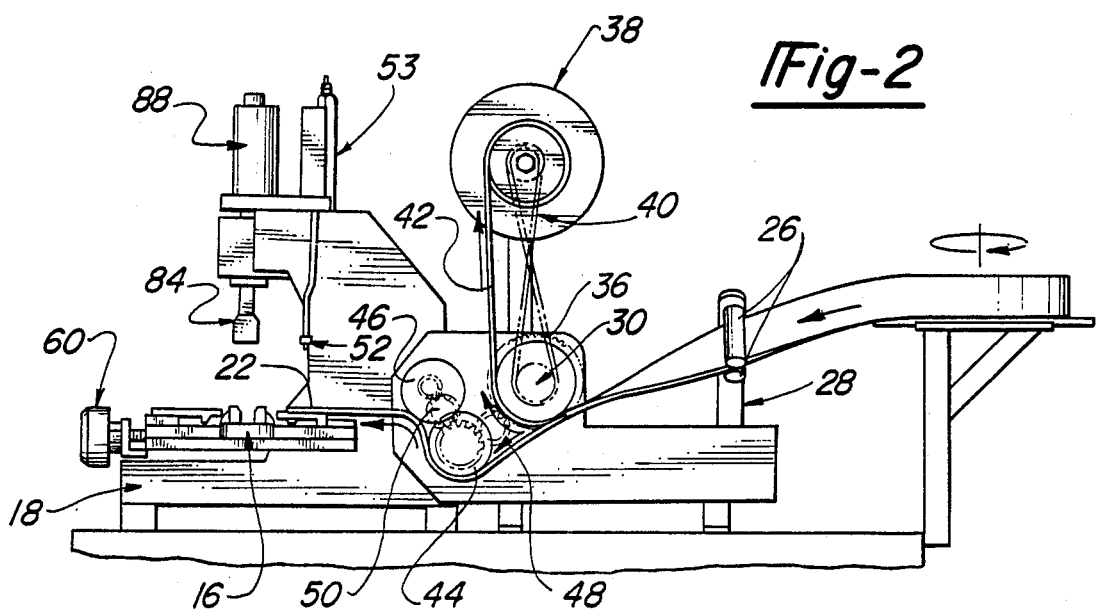
FIG. 2 is a side elevational view of the apparatus shown in FIG. 1.

Referring to FIG. 1, the apparatus 10 according to the present invention includes a tape supply means 12 adapted to deliver a segment of tape 14 to a cradle fixture 16 mounted in a machine frame 18 supported on a base 20.

The tape supply means 12 includes a reel of tape 22 resting horizontally on a support table 24 so that the windings of the tape are on edge, vertically disposed.

The tape 22 is of an autogenous type having a self welding surface, covered with a protective paper covering. Such material is described in U.S. Pat. Nos. 3,088,848 and 3,299,010. The horizontal disposition of the reel reduces the pressure exerted on the successive windings to minimize the tendency for adhesions to develop because of the autogenous nature of the material. The tape segment 14 however must lie flat in a horizontal plane.

Guide rollers 26 extending at an intermediate angle are therefore provided, supported on a pedestal 28 to guide tape from the vertical to the horizontal attitude. The tape 22 passes to a separation roller 30 rotated intermittently by a cylinder 32 reciprocating a rack gear 34, driving a spur gear 36.

Spur gear 36 rotates separation roller 30 and also a take up reel 38 by means of a belt 40. Take up reel 38 receives the covering paper strip 42 lying over the tacky side of tape 22.

Spur gear 36 in turn rotates a pair of dispensing cylinders 44, 46 via idler gears 48, 50 so as to rotate each cylinder in the same direction, advancing the tape 22 to the cradle fixture 16. Such an arrangement of dispensing cylinders 44, 46 are well known and consist of a series of spaced toothed plates interleaved together. Cylinders 44 and 46 are rotated at different speeds so that adhesion to the second cylinder 46 is prevented but acts to direct the tape 22 away and over the cradle fixture 16.

A hot wire cutoff 52 of a known type is operated with a cylinder 54, to descend to cut off a tape segment 14 from the remaining length of tape 22 during each cycle of the apparatus 10.

Figure 3:
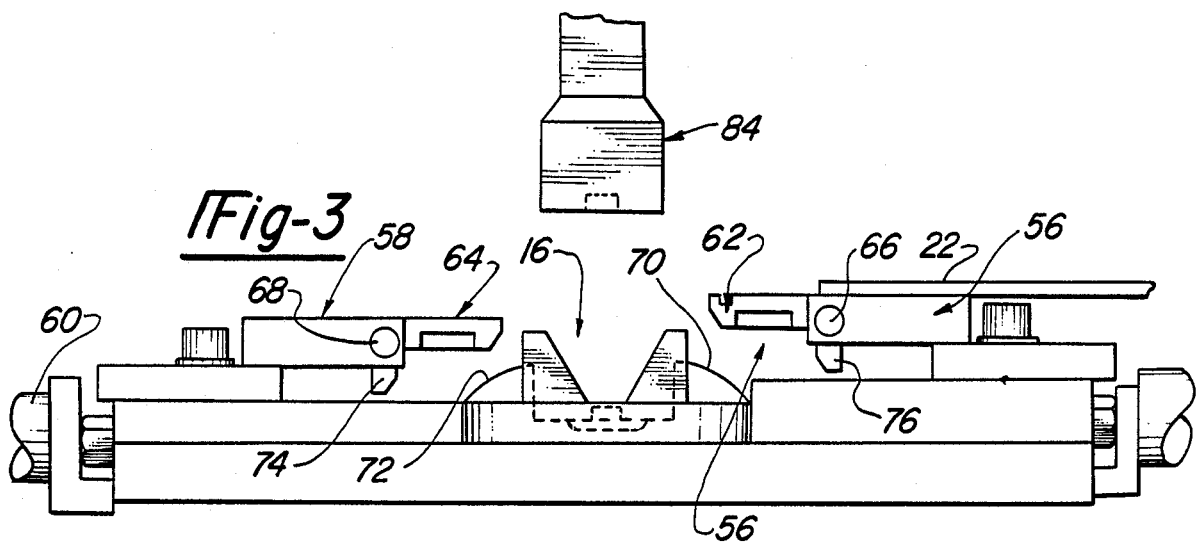
FIG. 3 is an enlarged side elevational view of the wrapping components prior to advance of a tape segment into the wrapping cradle fixture.

Referring to FIG. 3 the basic components involved in the wrapping process are illustrated.

An inside wrapping member 56 and an outside wrapping member 58 are positioned on opposite sides of the cradle fixture 16, each powered by a respective cylinder 60n to be advanced towards the cradle fixture 16.

The inside wrapping member 56 and outside wrapping member 58 each have a portion 62, 64 hinged at 66, 68 so that a downward movement occurs as advancing movement towards cradle fixture 16 takes place. Such downward movement is induced by a respective cam surface 70, 72 engaging a projective foot 74, 76 of each wrapping member 56, 58.

Figure 4:
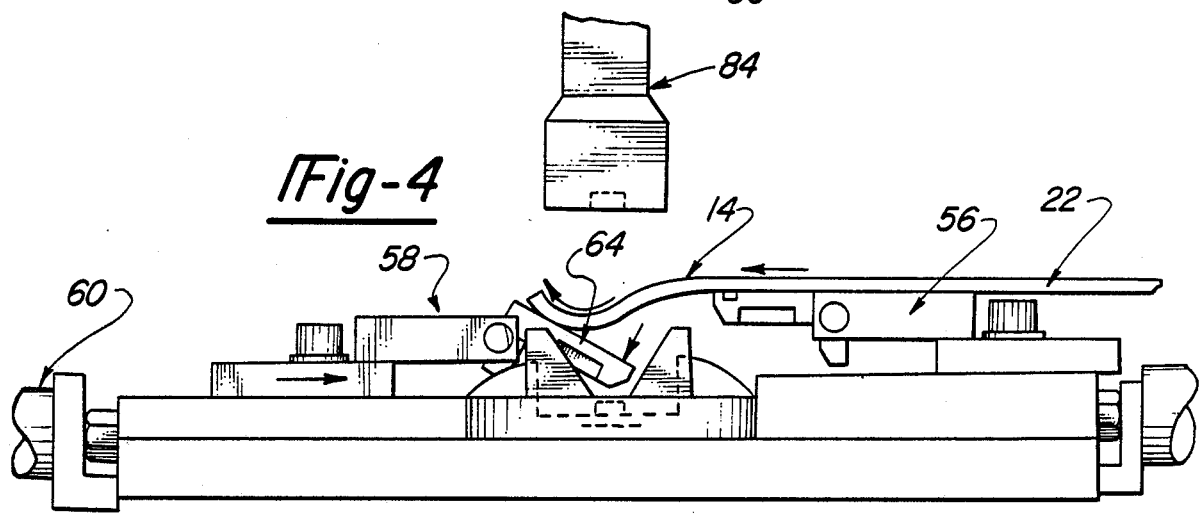
FIG. 4 is an enlarged side elevational view of the components shown in FIG. 3 with a tape segment advanced into the wrapping cradle fixture.
Figure 5:
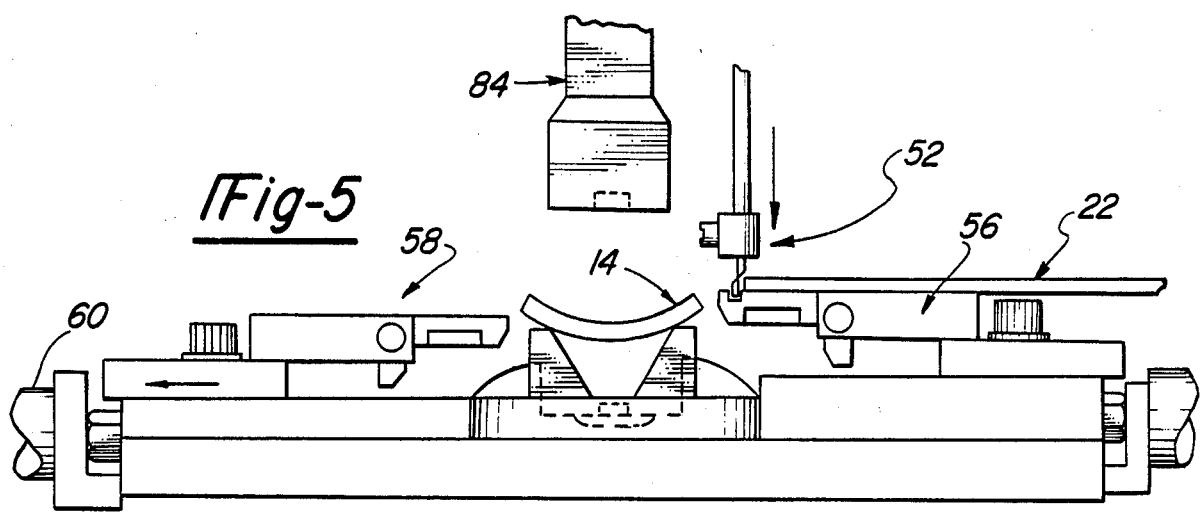
FIG. 5 is an enlarged side elevational view of the components shown in FIG. 4 after the tape segment is cut off.

The outside wrapping member 58 is advanced preparatory to cutoff of a tape segment 14, as shown in FIG. 4, so that the outside end of the tape segment 14 is deflected upward as the leading end is advanced and adheres to portion 64. The hot wire cut off 52 descends to execute cutoff as shown in FIG. 5 after the wrapping member 58 is retracted as shown.

Thus, the severed tape segment 14 lies across the cradle fixture 16.

The wire bundle 78 is then manually laid across the tape segment 14 with the splice (FIG. 11a), centered thereon, pushing the tape segment 14 down between cams 70, 72. An arming switch (not shown) is activated by a button 80 located at the bottom of the cradle fixture 16, so that any further operation is not enabled until the wire bundle 78 is in place.

Opposite pairs of nesting fingers 82 have converging surfaces so as to guide and retain the wire bundle 78 in a central position lying across the tape segment 14.

Figure 6:
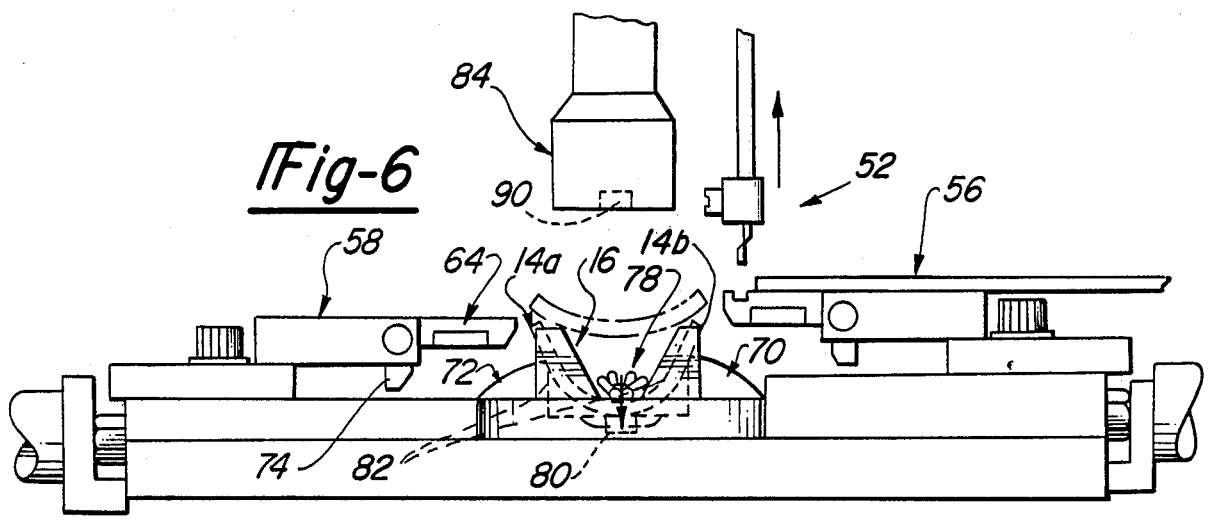
FIG. 6 is an enlarged side elevational view of the components shown in FIG. 5 with a wire bundle in position and the tape segment positioned in the wrapping cradle fixture.
Figure 7:
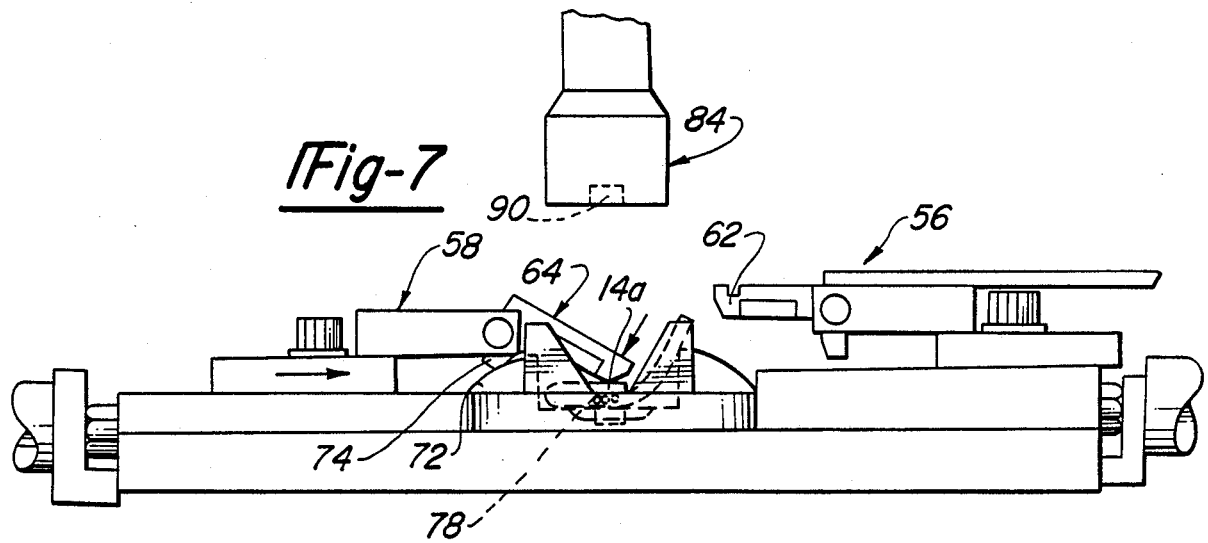
FIG. 7 is an enlarged side elevational view of the components shown in FIG. 6 with the outside wrapping member advanced to fold the outside tape segment end over the wire bundle.

In the position of the tape segment 14 shown in FIG. 6, the outside end thereof 14a is positioned to be engaged with the portion 64 thereof as it is advanced towards the cradle fixture 16 by pressurization of the cylinder 60, as by a manually controlled valve (not shown). This engagement folds the end 14a back over the wire bundle 78, and the plunging motion caused by the cam 72 engaging foot 74 during this advance presses the folded end 14a down over the wire bundle 78 as shown in FIG. 7.

Figure 8:
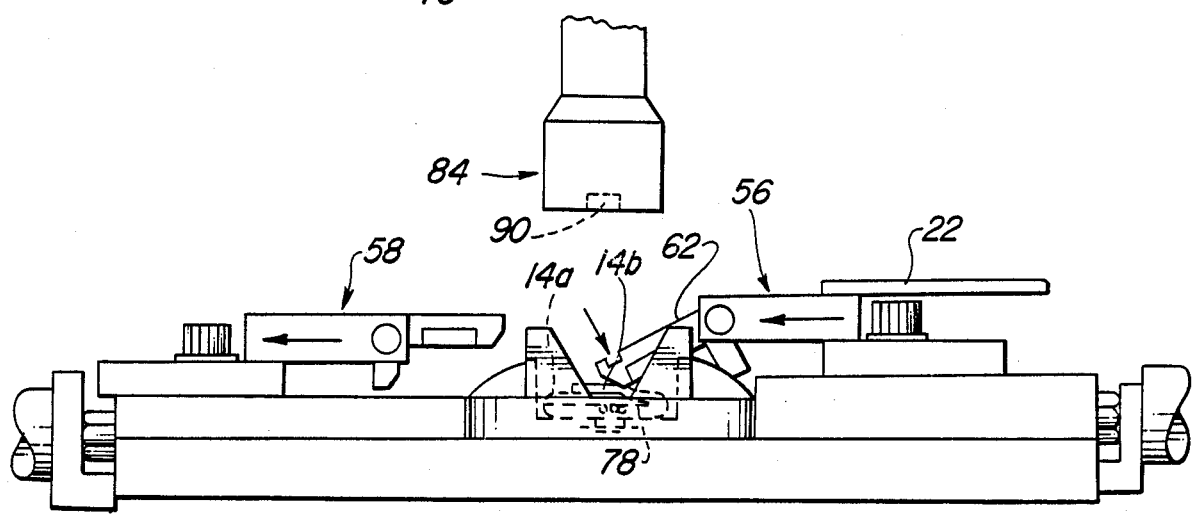
FIG. 8 is an enlarged side elevational view of the components shown in FIG. 7 with the inside wrapping member advanced over the opposite tape segment end.

After outside wrapping member 58 is withdrawn, inside wrapping member 56 is advanced as by pressurization of a corresponding cylinder 60 and valve (not shown), with portion 62 engaging inside end 14b of the tape segment 14 to fold and compress the same over the end 14 and the wire bundle 78 to complete the wrapping as shown in FIG. 8.

Also included is a pressure platen 84 mounted over the cradle fixture 16 for vertical movement on guide rods 86 with a cylinder 88 providing actuation power. The pressure platen 84 is moved down after the wrapping steps to tape segment 14 wrapped over the wire bundle 78 to insure sealing about the interstices between the wires. The pressure platen 84 is formed with a relief cavity 90 located to receive the splice 94 (FIG. 11a). Thus, minimal compression of the tape 14 occurs in the region of the uninsulated splice 92. This precludes undue pressing of the tape material while insuring a complete seal about the wraps shown in FIG. 11b.

FIG. 10 illustrates the details of the outside wrapping member 58, which includes the engagement portion 64 hinged to a mounting block 94 by a pivot pin 96. A pair of clevis ears 98 are fit within a recess 100, each having aligned holes 102 receiving pivot pin 96.

Engagement portion 64 has a chamfered nose 65 inclined to present a flat surface to compress the tape segment 14. A torson spring 104 surrounds pivot pin 96 and engages the mounting block 94 and portion 64 to the up position about pivot pin 96.

Mounting block 94 has a flange portion 106 affixed thereto which is adjustably secured to a slide 108 by capscrews 110 passed through slots 112 and received in threaded bores 114. This arrangement enables adjustment of the end position of engagement portion 64 for proper folding action.

Slide 108 has ways 116 guided between way blocks 118 mounted to base plate 120 secured to the frame 18. Slide 108 is secured to the operating rod of the cylinder 60 so as to be powered in its movement towards and away from the cradle fixture 16.

The cradle fixture 16 is also affixed to the base plate 120 with capscrews 122 received in counterbores 124 and tapped holes 126.

Accordingly it can be appreciated that the relatively simple apparatus and method described effectively accomplish the objectives outlined above.

I claim:

1. Apparatus for wrapping a bundle of wires comprising:
    tape supply means for feeding segments of wrapping tape;
    a cradle fixture adapted to receive a segment of tape from said tape supply means, said cradle fixture including guide means for positioning said bundle of wires across said tape segment;
    a pair of oppositely directed wrapping members mounted for in and out movement on either side of said cradle fixture, in a direction transverse to said wire bundle in said cradle fixture and generally aligned with said tape segment;
    actuator means for powered sequential movement of each of said wrapping members inwardly toward said wire handle;
    each of said wrapping members having an engagement portion located to engage a respective end of said tape segment as a respective wrapping member is advanced inwardly;
    each of said wrapping member engagement portion being hinged to be able to be moved downwardly; and
    cam means causing said downward movement as said wrapping member is advanced inwardly to cause plunging motion thereof to compress said tape as each of said tape ends is wrapped over said wire bundle.

2. The apparatus according to claim 1 further including a pressure platen positioned over said cradle fixture and movable up and down in alignment with the center of said wire bundle and said tape segment, said pressure platen including a portion moved to compress a wrapped wire bundle in said cradle fixture.

3. The apparatus according to claim 2 wherein said pressure platen is formed with a relief cavity limiting compression of said wrapped wire bundle in the central region thereof.

4. The apparatus according to claim 1 wherein said tape supply means supplies autogenous tape having one surface welding to itself when brought into mutual contact with another tape surface.

5. The apparatus according to claim 1 wherein each of said wrapping members is urged to the up position by torsion spring means overcome by said cam means upon advance inward of said wrapping member.

6. The apparatus according to claim 1 wherein said tape supply means advances said tape segment over the downwardly inclined top surface of one of said wrapping members in the in and down position to thereby be ramped up by contact with said wrapping member as said tape segment is advanced across said cradle fixture.

7. The apparatus according to claim 4 wherein said tape supply means includes a reel of said autogenous tape and means mounting said reel in a horizontal position and guiding said tape from said horizontal reel to be twisted to lie horizontal in said cradle fixture.

8. A method of wrapping a bundle of insulated wires having an uninsulated splice located at an intermediate location along the length of said bundle, comprising the steps of:

feeding a segment of wrapping tape to lie flat and lengthwise across a wrapping cradle fixture;

positioning said wire bundle across said tape segment with said splice centrally disposed;

advancing a first wrapping member from one end of said tape segment so as to engage said end with a portion thereof and fold the same across said wire bundle;

moving said portion downwardly as advancing to plunge to press said tape end against said wire splice after folding the same;

advancing a second wrapping member from the other end of said tape segment so as to engage said other end with a portion thereof so as to fold said other end back across said wire bundle, moving said portion downwardly as advanced so as to plunge to press said other tape segment end over said wire bundle and previously wrapped tape segment end, thereby wrapping said wire bundle.

9. The method according to claim 8 wherein autogenous tape is used to wrap said wire bundle, and further including the step of compressing said wrapped wire bundle to bond said wrapped tape segment to itself.

10. The method according to claim 9 wherein in said compressing step, a localized central region around said splice is not compressed to prevent thinning of said tape segment over said splice.

* * * * *

UNITED STATES PATENT AND TRADEMARK OFFICE
CERTIFICATE OF CORRECTION

PATENT NO. : 4,832,767

DATED : May 23, 1989

INVENTOR(S) : Donald G. Eller

It is certified that error appears in the above-identified patent and that said Letters Patent is hereby corrected as shown below:

Column 3, line 6, "60n" should be --60--.

Column 3, line 54, "to tape" should be --to compress the tape--.

Signed and Sealed this

Thirteenth Day of February, 1990

*Attest:*

JEFFREY M. SAMUELS

*Attesting Officer*      *Acting Commissioner of Patents and Trademarks*